L. H. BRUBAKER.
HOSE COUPLING.
APPLICATION FILED MAR. 31, 1914.
1,130,140.
Patented Mar. 2, 1915.
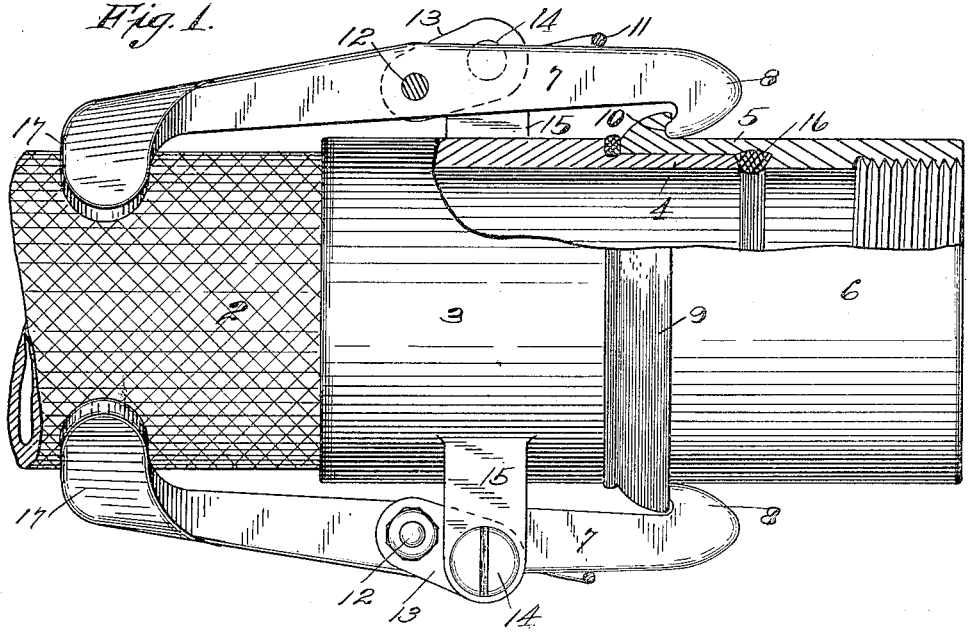
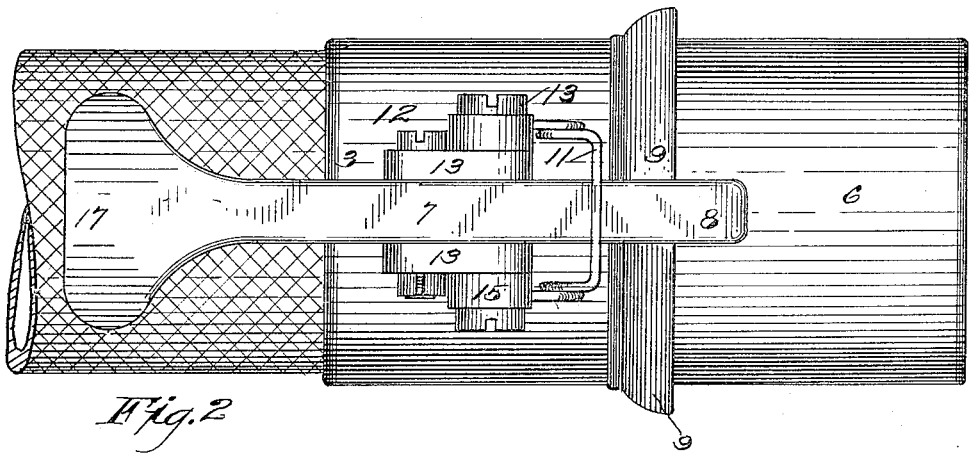
WITNESSES:
F. E. Maynard.
Irvine Sinnett.
INVENTOR
Lloyd H. Brubaker
BY G. H. Strong.
ATTORNEY

UNITED STATES PATENT OFFICE.

LLOYD H. BRUBAKER, OF SAN FRANCISCO, CALIFORNIA.

HOSE-COUPLING.

1,130,140.  Specification of Letters Patent.  Patented Mar. 2, 1915.

Application filed March 31, 1914. Serial No. 828,491.

*To all whom it may concern:*

Be it known that I, LLOYD H. BRUBAKER, a citizen of the United States, residing in the city and county of San Francisco and State of California, have invented new and useful Improvements in Hose-Couplings, of which the following is a specification.

This invention relates to hose coupling.

It is an object of the present invention to provide a hose coupler comprising male and female members respectively, attachable to fluid conductors such as hose ends or a hose end and a pipe end, or at a hydrant discharge mouth, and particularly to provide an automatic hose coupler with means for preliminarily and temporarily latching the separable coupler members together, said means being further operable by coöperation with an expansible portion of the conductor or hose for making a hermetically tight joint between the coupling members.

The invention consists of coupling members, one of which is provided with a socket or seat portion for the reception of a complementary part formed on the coöperative coupler section, means being provided upon one of the coupler sections and operable by fluid pressure within its connected hose or conductor, whereby through the expansion of the latter internal pressure will bring the coupler members into pressure-tight joint, and further consists of means for initially latching the coupler members in assembled position until the fluid pressure is sufficient to operate the joint-forming devices.

Figure 1 is a side elevation of the hose coupling in partial section after assembling. Fig. 2 is a plan view of the same.

2 represents a portion of a hose or other flexible conductor upon which may be secured a male coupling member 3 having its circumferential, reduced, forwardly projecting end portion 4 insertible into a complementary socket or seat portion 5 of the female member 6 of the coupling. Upon opposite sides of the coupling member 3 there are mounted latch levers 7 the hooks 8 of which are adapted to snap over a circumferential shoulder 9 on the coupler member 6, which shoulder is formed with a concaved seat 10 on its rear surface, and is preferably rounded or beveled on its forward surface so that as the coupling members 6 are assembled, the latch levers 7 will ride up over the shoulder 9 and snap behind same, the hooks 8 inter-locking with the complementary seat 10, the latches then operating to temporarily hold the coupling members against separation.

The latch members or levers 7 are subjected to the closing action of springs 11 which tend to throw the hooks 8 toward one another, so as to quickly snap over the shoulder 9 of the member 6.

While the levers 7 are shown as diametrically, oppositely disposed in the coupler member 3, it is understood that any number of these levers may be provided and disposed circumferentially about the member as may be desired, and that they may be mounted so as to properly function. In the present showing the levers 7 are approximately, centrally fulcrumed upon pivots or cranks 12, passing through crank arms or swinging links 13, which are pivoted at 14 in suitable bearing lugs 15 on the coupler member 3. The crank arms or limbs 13 are shown as inclined rearwardly from the coöperative faces of the coupler members 3—6, so that when the cranks or pivots 12 rock outwardly from the body of the coupler member 3 they tend to draw the lever hooks 8 rearwardly toward the bearing lugs 15, and thus pull the coupling member 6 toward the member 3 to complete the pressure-tight joint between these members at their engaging surfaces which may be packed with suitable packing rings or material 16.

For the purpose of utilizing the pressure of the fluid within the flexible conductor 2 as a means for automatically and hermetically closing the joint between the coupler members the rear ends of the levers 7 are shown as somewhat broadened and enlarged as at 17 to provide ample bearing surfaces which engage the adjacent exterior surfaces of the flexible conductor 2. The normal disposition of the ends 17 of the levers 7 will stand open sufficiently at their latch ends to permit the ready coupling of the coupler members 3—6, and then as pressure is admitted to the interior of the flexible conductor or hose 2, the latter will expand and force the bearing ends 17 of the levers outwardly, swinging their cranks or pivots 12 upwardly to the journals 15, the outward swinging of the cranks 12 tending to draw the levers 7 rearwardly, and through means of the latches 8, engaging the latch-supporting shoulder 9 of the member 6 will draw the latter rearwardly by the force derived from the pressure within the expansible conductor 2 acting upon the contiguous ends of the levers 7.

Thus it will be seen that I have provided a coupler of separable complementary joint-forming sections which are closed to form a hermetically tight joint through pressure derived from an expansible conductor as the hose 2 when the latter is subjected to internal pressure. It will be seen that the greater the pressure within the hose 2, the greater will be the outward swinging force re-acting upon the hose engaging the ends of the levers 7, and the greater will be the drafting of these levers, as their cranks 12 swinging downwardly and upwardly from their journals, and proportionately greater will be the pressure with which the joint is made and closed between the coupler members 3—6.

It is understood that any suitable design or means may be employed for causing the rearward draft or moving tendency of the levers 7 as the hose expands against the bearing ends of the levers, it being understood that the general principle involved in the present invention is to provide a hose coupling comprising joint-forming, detachable or separable members, with means controlled by and subjected to the pressure within a flexible conductor, whereby the pressure in the conductor may be utilized to make a pressure-tight joint between the coupler members.

Having thus described my invention, what I claim and desire to secure by Letters Patent is:

In a hose coupling, a pair of separable members, one of said members being formed with a shoulder which is provided with an annular continuous seat and an annular continuous part which extends over and beyond the seat, a pair of latch levers having hooks which engage in said seat and with the inner face of said part which extends over and beyond the seat, said levers having portions which engage with the hose and means to connect the levers to the other of said members whereby when the hose expands said hooks of the levers will be drawn against the seat and against the inner face of said part which extends over and beyond the seat.

In testimony whereof I have hereunto set my hand in the presence of two subscribing witnesses.

LLOYD H. BRUBAKER.

Witnesses:
JOHN H. HERRING,
W. W. HEALY.

Copies of this patent may be obtained for five cents each, by addressing the "Commissioner of Patents, Washington, D. C."